United States Patent [19]
Yamakawa

[11] Patent Number: 5,343,325
[45] Date of Patent: Aug. 30, 1994

[54] OPTICAL SCANNING SYSTEM WITH TILT CORRECTION FUNCTION

[75] Inventor: Hiromitsu Yamakawa, Ohmiya, Japan

[73] Assignee: Fuji Photo Optical Co., Ltd., Saitama, Japan

[21] Appl. No.: 954,880

[22] Filed: Sep. 30, 1992

[30] Foreign Application Priority Data

Feb. 5, 1992 [JP] Japan ................... 4-019937

[51] Int. Cl.$^5$ ............ G02B 26/08; G02B 13/18; G02B 9/04
[52] U.S. Cl. ............................ 359/205; 359/710; 359/711; 359/717; 359/795
[58] Field of Search ................ 359/205–206, 359/212–219, 795, 662, 717, 710–711; 250/235–236

[56] References Cited

U.S. PATENT DOCUMENTS 5,025,268  6/1991  Arimoto et al. ............. 359/205
5,062,679  11/1991 Itabashi .................... 359/206
5,206,755  4/1993  Yawmakawa ................. 359/795

FOREIGN PATENT DOCUMENTS 48-98844  12/1973  Japan.
56-36622  4/1981  Japan.
57-35823  2/1982  Japan.
61-84620  4/1986  Japan.
63-50814  3/1988  Japan.

Primary Examiner—Loha Ben
Assistant Examiner—James Phan
Attorney, Agent, or Firm—Brumbaugh, Graves, Donohue & Raymond

[57] ABSTRACT

A compact scanning optical system for effecting a superior tilt surface correction and for reducing a field curvature. The system is provided with a focusing optical system which is composed of a first single lens and a second single lens, wherein the first single lens, with a positive refracting power in a plane of scan, has a toric surface from an image plane and the second single lens, with a negative refracting power in the scan plane, has an aspherical lens.

16 Claims, 5 Drawing Sheets

FIG. 3A
SPHERICAL ABERRATION

FIG. 3B
ASTIGMATISM

FIG. 3C
DISTORTIONAL ABERRATION

FIG. 4A
SPHERICAL ABERRATION

FIG. 4B
ASTIGMATISM

FIG. 4C
DISTORTIONAL ABERRATION

FIG. 5A

SPHERICAL ABERRATION

ASTIGMATISM

DISTORTIONAL ABERRATION

SPHERICAL ABERRATION

ASTIGMATISM

DISTORTIONAL ABERRATION

-0.5    0.5(%)

FIG. 7A
SPHERICAL ABERRATION

-0.05    0.05(mm)

FIG. 7B
ASTIGMATISM

-5    5(mm)

FIG. 7C
DISTORTIONAL ABERRATION

-0.5    0.5(%)

FIG. 8A
SPHERICAL ABERRATION

-0.05    0.05(mm)

FIG. 8B
ASTIGMATISM

-5    5(mm)

FIG. 8C
DISTORTIONAL ABERRATION

-0.5    0.5(%)

OPTICAL SCANNING SYSTEM WITH TILT CORRECTION FUNCTION

BACKGROUND OF THE INVENTION

1. Field of the Invention

This invention relates to an optical scanning system for correcting the tilt of a reflecting surface, as employed in a laser beam printer or a laser engraving process and, more particularly, to an optical scanning system with a tilt correction function for correcting nonuniformity in the pitch between the scanning lines, due to the inclination of a deflecting surface of a polygon mirror, which acts as a beam reflector in the optical scanning system.

2. Description of the Prior Art

Heretofore, a scanning optical system for effecting a beam scanning over an image plane has widely been known, wherein a light beam from a light source such as a laser beam collimated by a first focusing optical system is caused to mechanically scan or an image plane through a second focusing optical system which focuses the scanning beam onto the image plane.

The deflecting surfaces or facets of the rotating polygon mirror may sometimes be tilted relative to the axis of rotation, or the axis of mounting, of the polygon mirror, in spite of the fact that the deflecting surface and the mirror are originally intended to be aligned parallel to each other. Therefore, such a tilt in the deflecting surface during the scanning, which is commonly called a tilt surface problem, results in nonuniform pitches between the lines on the image plane in the direction (hereinafter referred to as a sub-scan direction) perpendicular to the direction of the main scan, thereby adversely affecting the quality of the image formed by the scanning.

In order to optically correct the tilt of the deflecting surface and enhance the quality of a final image, there have been proposed various optical systems, in which a deflecting surface and an image plane are positioned in a conjugate plane that is perpendicular to the scan plane.

Examples of such an optical system include that shown in Japanese Unexamined Patent Publication No. 48(1973)-98844 which utilizes an optical system positioned between a deflecting surface and an image plane, composed of, from the deflecting surface, a spherical lens which has the distortion characteristics for achieving a uniform scan and a lengthy cylindrical lens.

Japanese Unexamined Patent Publication No. 61(1986)-84620 is illustrative of an optical system including a cylindrical mirror instead of the lengthy cylindrical lens.

Moreover, Japanese Unexamined Patent Publication Nos. 56(1981)-36622, 57(1982)-35823, 63(1988)-50814 disclose an optical system using a lens, which has a toric surface for correcting distortions due to the tilt of the reflecting surface, as an element in the system that has distortion characteristics for effecting a uniform scan.

However, the arrangement of the lenses disclosed in the foregoing Publication No. 48(1973)-98844, i.e., consisting of the spheric lens system and the lengthy cylindrical lens, requires the cylindrical lens to be positioned in proximity to the image plane in order to correct a field curvature. Hence, the cylindrical lens becomes longer as the increase of the scan range, thereby deterring a reduction, in size, of the optical system.

Meanwhile, the optical system disclosed in the Publication No. 61(1986)-84620 seems to have attained nominal improvements in view of the amount of field curvature as compared with the optical system using the cylindrical lens.

This optical system also permits the cylindrical mirror to be positioned at a greater distance from the image plane when compared with the optical system employing the cylindrical lens, whereby it is believed that the optical system may be reduced in dimensions. However, this optical system is restricted in arrangement because of the deflection of light beam by means of the cylindrical mirror.

The optical lens systems shown in the Publication Nos. 56(1981)-36622, 57(1982)-35823, 63(1988)-50814 are reduced in size by use of a lens, as an element in the optical system, having a toric surface which corrects distortions due to the tilt of the surface, thereby obviating the need for the lengthy cylindrical lens or the lengthy cylindrical mirror set forth in the above.

However, according to this optical system, the arrangement of the system that comprises two single lenses renders the back focus of the lens system longer in the scan plane than its focal length. The two lenses are, from the deflecting surface, a first single lens having either a spherical or cylindrical surface and a second single lens having a toric surface and a positive refracting power in the scan plane. Therefore, as a whole, the optical system cannot expect much reduction of its size by shortening the optical path between the optical scanning system and the image plane.

SUMMARY OF THE INVENTION

It is therefore a general object of this invention to provide a compact scanning optical system with a tilt correcting function which allows a reduction of a field curvature and an improvement of distortion characteristics for effecting a uniform scan.

It is another object of this invention to provide a compact scanning optical system with a tilt correcting function which can eliminate deterioration in the quality of the image particularly caused by the field curvature due to the tilt of a deflecting surface.

To achieve these objects, according to one aspect of this invention, there is provided an optical scanning system including a first focusing optical system for focusing a light beam from a light source in the form of a line image upon, or adjacent to, a deflecting surface of a deflecting means, and a second focusing optical system for focusing, on an image plane, an image of the line image, wherein the improvement comprises;

the second focusing optical system including, respectively from the deflecting means, a first single lens and a second single lens, the first single lens having a positive refracting power in the plane of scan and a toric surface, and the second single lens having a negative refracting power in the scan plane and an aspherical surface.

Such an arrangement of the lenses suppresses a displacement of scanning lines in the plane perpendicular to the direction of scan and field curvatures due to the tilting of the deflection surface. Moreover, the arrangement allows a reduction of the back focus of the lens system in the scan plane so that it becomes shorter than the focal length, thereby shortening the optical path and, hence, leading to a compact optical scanning system.

The adoption of a lens, having an aspherical surface, as a second single lens leads to a remarkable improvement of the performance of image formation, particularly distortion characteristics which effect a uniform scan, of the optical system. Consequently, according to this optical system, much improvement can be expected in the quality of image.

DETAILED DESCRIPTION OF THE INVENTION

With reference to the accompanying drawings, preferred embodiments of this invention will be described in detail hereinbelow.

Figure 1:
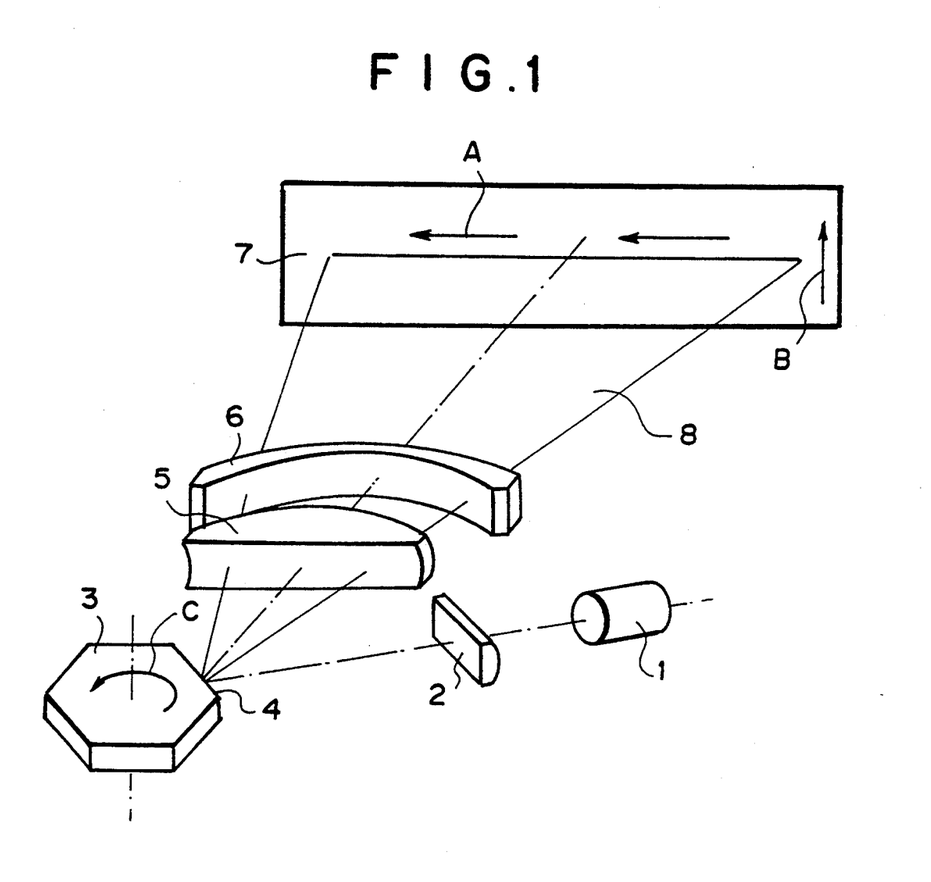
FIG. 1 is a perspective view showing an optical scanning system according to one embodiment of this invention.

FIG. 1 is a perspective view showing a scanning optical system according to one embodiment of this invention.

In this scanning optical system, a laser beam emanating from a light source 1 is focused into a line image upon, or adjacent to, a deflecting surface 4 of a deflecting means 3 through a cylindrical lens 2 which acts as a first focusing optical system and produces a line image from a substantially collimated light beam of the light source 1.

The deflector 3 is composed of a rotating polygon mirror disposed in proximity to the image formation point of the cylindrical lens 2. The light beam deflected by the deflecting surface 4 is projected onto an image plane 7 in the form of an image through a second focusing optical system 5 and 6 which produces an image, on the image plane 7, from the light beam deflected by the deflector 3. Rotating the deflector 3 at high velocity in a direction C causes the image plane 7 to be scanned in a direction A by the light beam.

Together with a modulation of the light beam, the combination of the main transverse scan and a vertical scan (hereinafter referred to as a sub scan) which is perpendicular to the direction of the main scan over the image plane allows a production of an image.

The second focusing optical system 5 and 6 is constituted of a first single lens 5, which has a positive power in the plane 8 of scan, and a second single lens 6, which has a negative power in the scan plane 8.

The first single lens 5 has preferably, respectively from the deflector, either a cylindrical surface or a toric surface and a toric surface. In any event, this first single lens is inevitably provided with at least one toric surface on either side thereof.

Here, as is well known, the toric surface has a refracting power different in each of the directions, that is, a transverse direction (the main scan direction) and a vertical direction (the sub-scan direction).

The first single lens 5 has a positive refracting power in the scan plane 8 and, relative to the image plane, a convex curvature directed to the image plane 7 in the scan plane 8.

More preferably, the first single lens 5 is constituted of a meniscus lens which has a positive power in the plane perpendicular to the scan surface 8 (in the plane formed along the sub-scan direction). The meniscus lens has, respectively from the deflector, a concave curvature relative to the deflecting means 3 and a convex curvature relative to the image plane 7

The second single lens 6 has an aspherical surface on either side thereof, i.e., the deflecting means side thereof or at the image plane side thereof, or at both sides thereof.

This second single lens 6 has, preferably, a negative power in the scan plane 8. In the scan plane 8, the lens has, respectively from the deflector, a concave curvature relative to the deflecting means 3 and a convex curvature relative to the image plane 7. In the plane perpendicular to the scan plane 8 (i.e., in the plane along the sub-scan direction), the second single lens 6 has preferably, respectively from the deflector, either a concave curvature or a linear plane surface relative to the deflecting means 3 and a convex or a linear surface relative to the image plane 7.

Further, the use of a lens having an aspherical surface as the second single lens 6 results in a remarkable improvement in the image forming performance, especially the distortion characteristics that effects a uniform scanning, of the optical system, thereby leading to a finely detailed image.

Still further, the choice of a material which is easily processed into an aspherical shape may permit a reduction in cost.

In the embodiment, the following conditions should, preferably, be satisfied $$0.2 < fv/f < 0.5$$

where, "fv" designates a synthetic focal length of the second focusing optical system 5 and 6, which lies in the plane orthogonal to the main scan direction (in the sub-scan direction); and "f", a synthetic focal length of the second focusing optical system 5 and 6, which lies in the scan plane 8.

The above conditions define the ratio of the synthetic focal length in the plane orthogonal to the main scan direction to the synthetic focal length which lies in the scan plane.

Below the lowermost of the above conditions, the absolute value of a magnifying power between the deflecting surface 4 and the image plane 7 is increased in the plane of the sub-scan direction, so that the accuracy of the deflecting surface 4 positioning affects the image forming performance to a much greater extent. This eventually requires a very critical accuracy in the positioning of the deflecting surface 4.

Moreover, the increase in the absolute value of the magnifying power also results in an increase in field curvatures, rendering the spot on the image plane 7 nonuniform in size.

Meanwhile, beyond the uppermost of the conditions, the second focusing optical system 5 and 6 may be extended, or may be moved, toward the image plane 7 and, hence, the two single lenses 5 and 6, which constitute the second focusing optical system, will be increased in size. In this case, a reduction in size of the optical system as a whole may be expected, but not a reduction in cost.

Figure 2A:
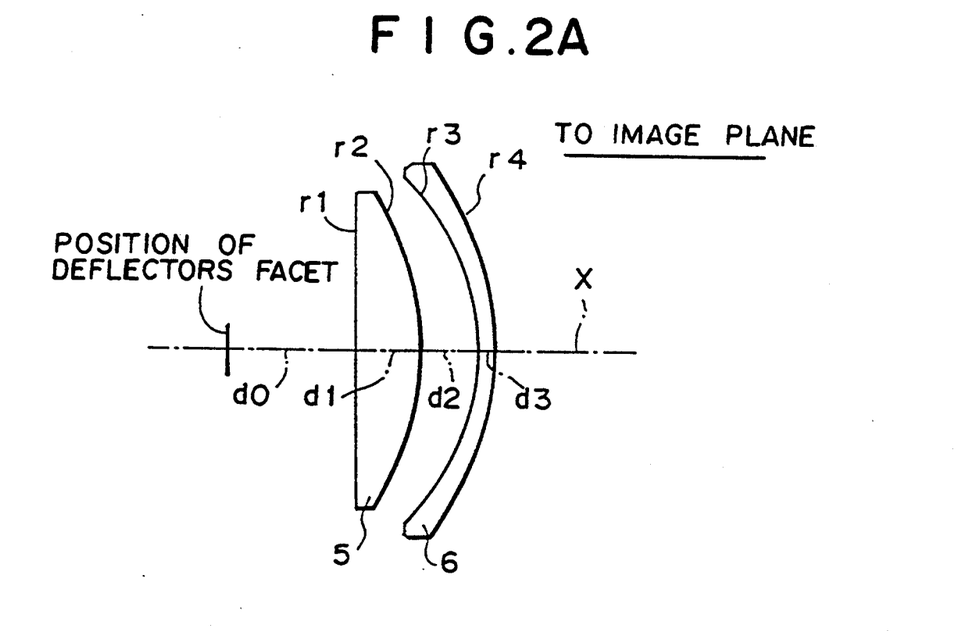
FIG. 2A is a transverse cross-sectional view of a second focusing optical system.

One example of cross sections of the second focusing optical system 5 and 6 in this optical scanning system which are taken along the main scan plane and the sub-scan plane is represented as follows. Specifically, as shown in FIG. 2A, the cross section, which is taken along the main scan plane, illustrates that the first single lens 5 with a positive diffracting power has, at an end thereof closer to the image plane, a convex surface relatively to the same, and the second single lens 6, in the form of a meniscus lens with a negative refracting power, has, at an end thereof closer to the image plane, a convex surface relative to the same.

Embodiments having concrete preset values will be described hereinbelow.

Throughout the embodiments from first to sixth, each reference symbol designates as follows:

m: a surface number which is counted respectively from the object r: a radius of curvature in a scan plane rv: a radius of curvature in the plane orthogonal to the scan direction (in a direction of sub-scan)

d: the thickness of lens or an aerial spacing n: a refractive index at a wavelength of 780 nm d0: a distance between a deflecting surface and a first surface of a second focusing optical system 5 and 6 f: a synthetic focal length of the second focusing optical system 5 and 6 in the scan plane fv: a synthetic focal length of the second focusing optical system 5 and 6 in the plane orthogonal to the scan direction (in the sub-scan direction)

Bf: a synthetic back focus of the second focusing optical system 5 and 6 in the scan plane Distortions shown in FIGS. 3 through 8 are of values defined by the following equations.

$$(H - f \times \theta)/(f \times \theta) \times 100(\%)$$

where,

H: the height of a real image obtained when an angle of scan is $\theta$ f: a synthetic focal length of the second focusing optical system 5 and 6 in the scan plane $\theta$: a scan angle (unit: radian)y Also, an aspherical shape is determined by the following equation.

$$Z = cc \cdot y^2/(1 + \sqrt{1 - k \cdot cc^2 \cdot y^2}) + \sum_{i=2}^{5} (ai \cdot y^{2i})$$

where, "y" designates a distance from the optical axis X of the aspherical surface; and Z, a coordinate in the direction of optical axis X when the position of the plane on the optical axis X is set to zero.

First Embodiment

Figure 2B:
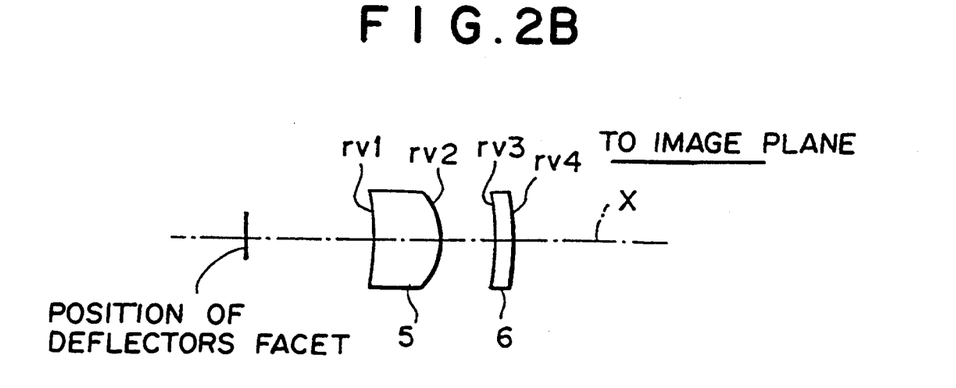
FIG. 2B is a vertical cross-sectional view of the second focusing optical system.

With the principle arrangement of the lenses shown in FIGS. 2A and 2B, the first single lens 5 has, respectively from the deflector, a cylindrical surface and a toric surface, and the second single lens 6 has, respectively from the deflector, an aspherical surface and a spherical surface. The specific values of the first embodiment are shown in a first table below.

| m | r | rv | d | n |
|---|---|---|---|---|
| 1 | ∞ | −48.152 | 13.91 | 1.71222 |
| 2 | −60.110 | −14.896 | 12.22 | |
| 3 | aspherical surface | aspherical surface | 3.76 | 1.48471 |
| 4 | −62.161 | −62.161 | | |

| Coefficients of the aspherical surface are as follows: | |
|---|---|
| $cc = -2.0384 \times 10^{-2}$ | $k = 1.0329$ |
| $a2 = 3.2846 \times 10^{-7}$ | $a3 = -2.9239 \times 10^{-10}$ |
| $a4 = 7.6774 \times 10^{-14}$ | $a5 = 1.5020 \times 10^{-17}$ |
| $f = 100$ | Wavelength $\lambda = 780$ nm |
| $fv/f = 0.2719$ | F/NO 50 |
| $Bf = 84.65$ | |

Figure 3A:
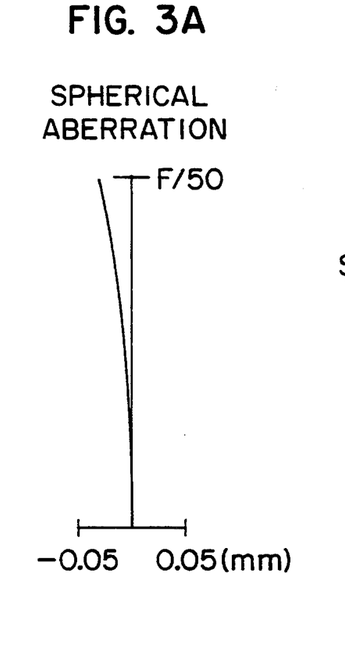
FIGS. 3A-3C show aberration curves of a scanning optical system according to a first embodiment of this invention.
Figure 3B:
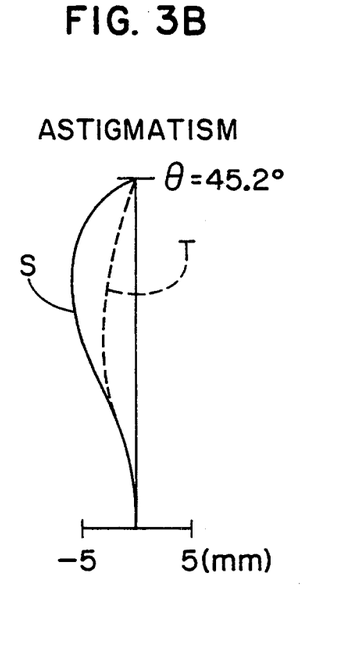
Figure 3C:
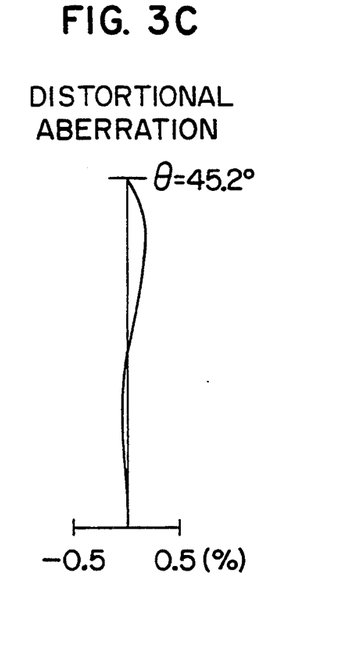

FIGS. 3A–3C show distortions of a first embodiment according to this invention. Characteristic curves of spherical aberration and astigmatism illustrated in FIGS. 3A–3C represent distortions in the scan plane 8. Throughout the drawings from FIGS. 3A–3C to FIGS. 8A–8C, S designates an image surface in the direction of sub scan; and T, an image surface in the direction of main scan.

Second embodiment

With the principle arrangement of the lenses shown in FIGS. 2A and 2B, the first single lens 5 has, respectively from the deflector 3, a cylindrical surface and a toric surface, and the second single lens 6 has, respectively from the deflector 3, a spherical surface and an aspherical surface. Specific values of the second embodiment will be as follows:

| m | r | rv | d | n |
|---|---|---|---|---|
| 1 | ∞ | −48.152 | 13.91 | 1.71222 |
| 2 | −60.110 | −14.896 | 12.22 | |
| 3 | −49.058 | −49.058 | 3.76 | 1.48471 |
| 4 | aspherical surface | aspherical surface | | |

| Coefficients of the aspherical surface are as follows: | |
|---|---|
| $cc = -1.6087 \times 10^{-2}$ | $k = 3.2059 \times 10^{-1}$ |
| $a2 = -6.7609 \times 10^{-7}$ | $a3 = 3.7061 \times 10^{-10}$ |
| $a4 = -2.2867 \times 10^{-13}$ | $a5 = 3.8416 \times 10^{-17}$ |
| $d0 = 27.76$ | Scan angle $\theta = 45.2°$ |
| $f = 100$ | Wavelength $\lambda = 780$ nm |
| $fv/f = 0.2719$ | F/NO 50 |
| $Bf = 84.65$ | |

Figure 4A:
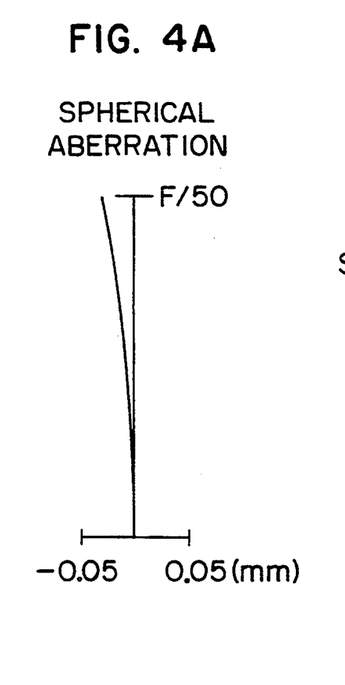
FIGS. 4A-4C show aberration curves of a scanning optical system according to a second embodiment of this invention.
Figure 4B:
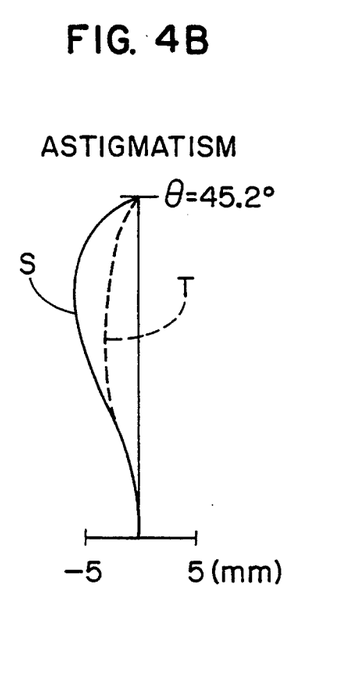
Figure 4C:
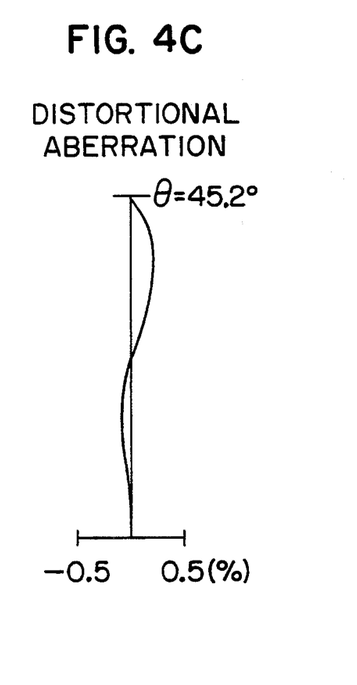

FIGS. 4A–4C show distortions of a second embodiment according to this invention.

Third Embodiment

With the principle arrangement of lens shown in FIGS. 2A and 2B, the first single lens 5 has, respectively from the deflector, a cylindrical surface and a toric surface, and the second single lens 6 has two aspherical surfaces. Specific values of the third embodiment will be as follows:

| m | r | rv | d | n |
|---|---|---|---|---|
| 1 | ∞ | −48.152 | 13.91 | 1.71222 |
| 2 | −60.110 | −14.896 | 12.22 | |
| 3 | aspherical surface 1 | aspherical surface 1 | 3.76 | 1.48471 |
| 4 | aspherical surface 2 | aspherical surface 2 | | |

Figure 5A:
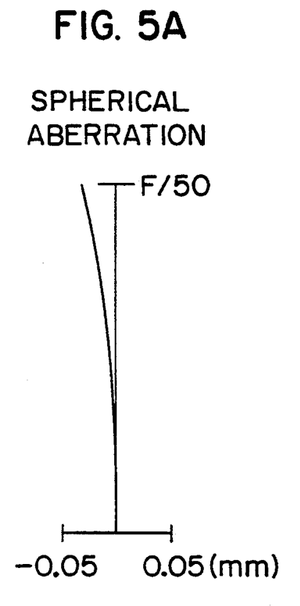
FIGS. 5A-5C show aberration curves of a scanning optical system according to a third embodiment of this invention.
Figure 5B:
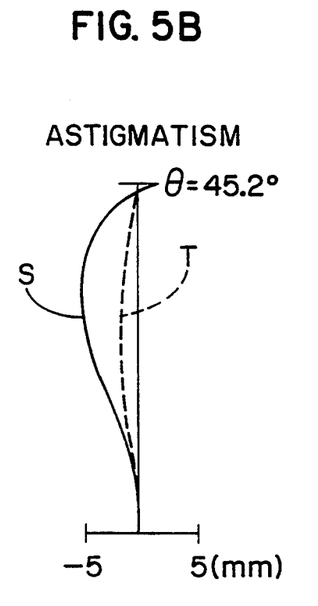
Figure 5C:
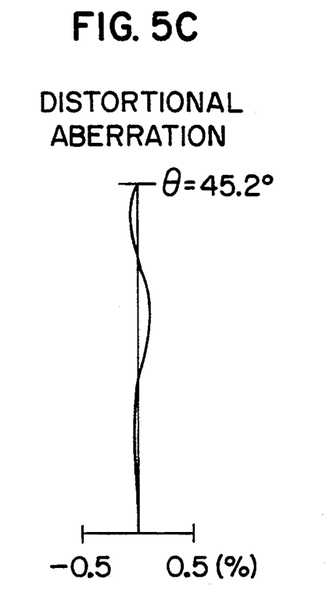

Coefficients of the aspherical surface 1 are as follows:

$cc = -2.0384 \times 10^{-2}$     $k = -2.3614$
$a2 = -3.4655 \times 10^{-6}$     $a3 = -3.9192 \times 10^{-9}$
$a4 = -2.6091 \times 10^{-12}$    $a5 = 8.6327 \times 10^{-17}$ Coefficients of the aspherical surface 2 are as follows:

$cc = -1.6087 \times 10^{-2}$     $k = 1.4803$
$a2 = 9.0000 \times 10^{-5}$      $a3 = -2.9357 \times 10^{-9}$
$a4 = 1.9851 \times 10^{-12}$     $a5 = -9.3835 \times 10^{-17}$
$d0 = 27.76$                      Scan angle $\theta = 45.2°$
$f = 100$                         Wavelength $\lambda = 780$ nm
$fv/f = 0.2719$                   F/NO 50
$Bf = 85.05$ FIGS. 5A-5C show distortions of a third embodiment according to this invention.

Fourth embodiment

With the principle arrangement of the lenses shown in FIGS. 2A and 2B, the first single lens 5 has two toric surfaces, and the second single lens 6 has, respectively from the deflector 3, a spherical surface and an aspherical surface. Specific values of the fourth embodiment will be as follows:

| m | r | rv | d | n |
|---|---|---|---|---|
| 1 | −527.692 | −47.571 | 13.91 | 1.71222 |
| 2 | −51.237 | −14.648 | 12.22 | |
| 3 | −38.789 | −38.789 | 3.76 | 1.48471 |
| 4 | aspherical surface | aspherical surface | | |

Figure 6A:
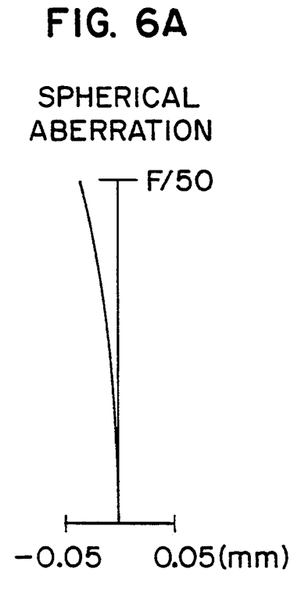
FIGS. 6A-6C show aberration curves of a scanning optical system according to a fourth embodiment of this invention.
Figure 6B:
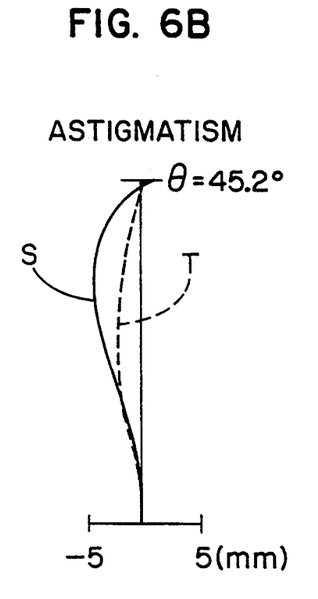
Figure 6C:
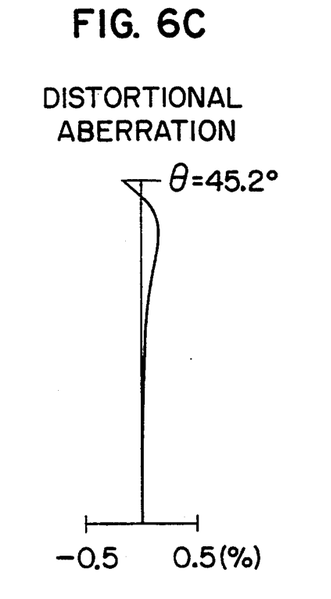

Coefficients of the aspherical surface are as follows:

$cc = -1.9379 \times 10^{-2}$     $k = 5.2097 \times 10^{-1}$
$a2 = -8.2525 \times 10^{-7}$     $a3 = -5.4780 \times 10^{-10}$
$a4 = 4.8193 \times 10^{-13}$     $a5 = -3.0601 \times 10^{-16}$
$d0 = 27.76$                      Scan angle $\theta = 45.2°$
$f = 100$                         Wavelength $\lambda = 780$ nm
$fv/f = 0.2715$                   F/NO 50
$Bf = 85.05$ FIGS. 6A-6C show distortions of a fourth embodiment according to this invention.

Fifth embodiment

With the principle arrangement of the lenses shown in FIGS. 2A and 2B, the first single lens 5 has, respectively from the deflector, a cylindrical surface and a toric surface, and the second single lens 6 has, respectively from the deflector, an aspherical surface and a cylindrical surface. Specific values of the fifth embodiment will be as follows:

| m | r | rv | d | n |
|---|---|---|---|---|
| 1 | ∞ | −44.868 | 13.53 | 1.71222 |
| 2 | −46.691 | −10.423 | 5.41 | |
| 3 | aspherical surface | aspherical surface | 12.03 | 1.76592 |
| 4 | −57.118 | ∞ | | |

Figure 7A:
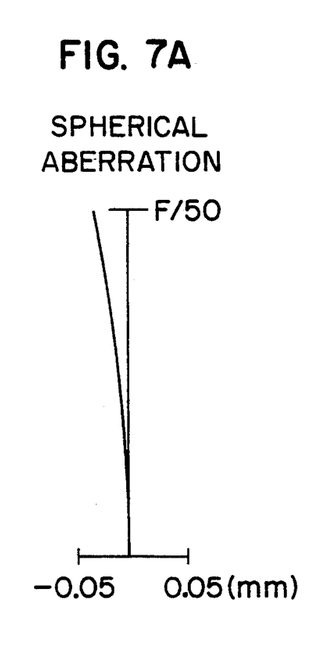
FIGS. 7A-7C show aberration curves of a scanning optical system according to a fifth embodiment of this invention.
Figure 7B:
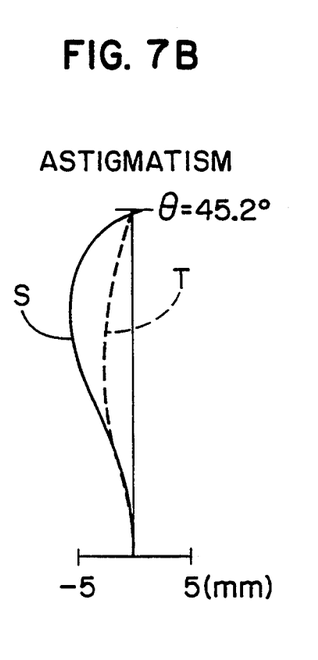
Figure 7C:
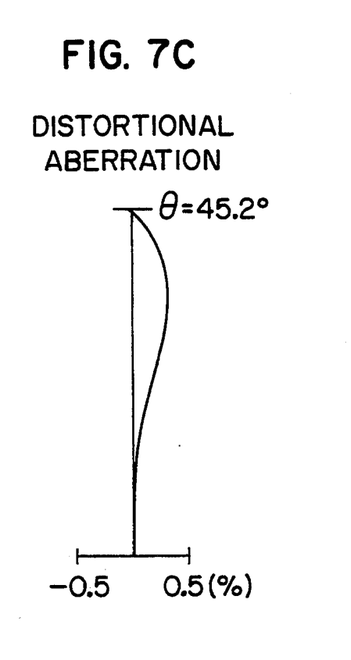

$cc = -2.5318 \times 10^{-2}$     $k = 1.0494$
$a2 = 3.8588 \times 10^{-7}$      $a3 = -6.6883 \times 10^{-10}$
$a4 = 6.2253 \times 10^{-13}$     $a5 = -4.0857 \times 10^{-17}$
$d0 = 23.30$                      Scan angle $\theta = 45.2°$
$f = 100$                         Wavelength $\lambda = 780$ nm -continued $fv/f = 0.2192$                   F/NO 50
$Bf = 93.50$ FIGS. 7A-7C show distortions of a fifth embodiment according to this invention.

Sixth embodiment

With the principle arrangement of lens shown in FIGS. 2A and 2B, the first single lens 5 has, respectively from the deflector, a cylindrical surface and a toric surface, and the second single lens 6 has, respectively from the deflector, a cylindrical surface and an aspherical surface. Specific values of the sixth embodiment will be as follows:

| m | r | rv | d | n |
|---|---|---|---|---|
| 1 | ∞ | −21.488 | 15.40 | 1.71222 |
| 2 | −60.791 | −14.065 | 52.28 | |
| 3 | −50.567 | ∞ | 15.04 | 1.76592 |
| 4 | aspherical surface | aspherical surface | | |

Figure 8A:
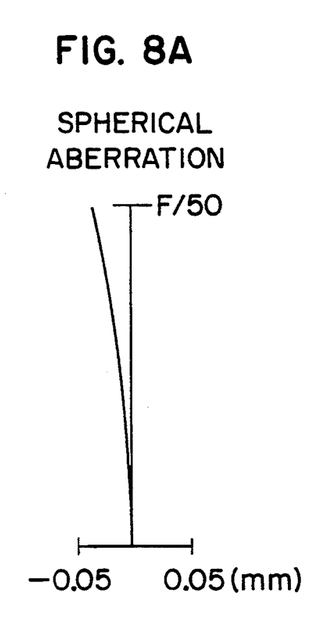
FIGS. 8A-8C show aberration curves of a scanning optical system according to a sixth embodiment of this invention.
Figure 8B:
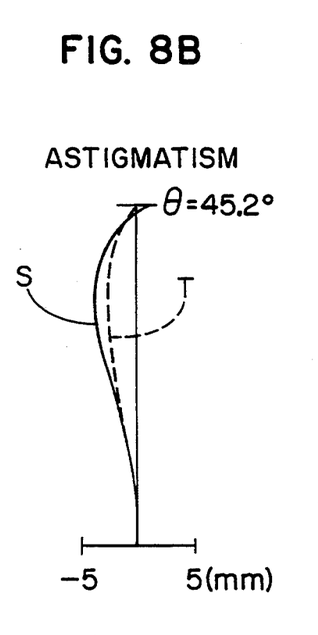
Figure 8C:
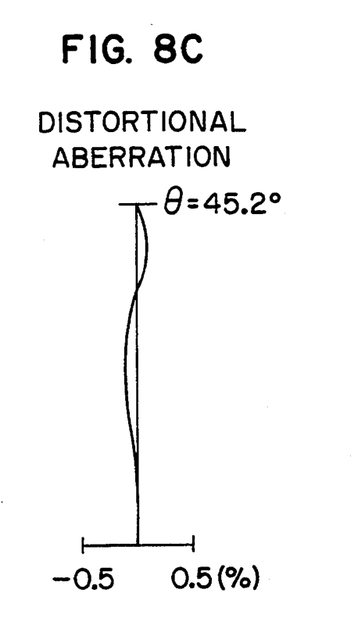

$cc = -1.6061 \times 10^{-2}$     $k = 9.9497 \times 10^{-1}$
$a2 = -2.6724 \times 10^{-8}$     $a3 = -4.4664 \times 10^{-11}$
$a4 = 3.1036 \times 10^{-14}$     $a5 = -5.3904 \times 10^{-18}$
$d0 = 28.66$                      Scan angle $\theta = 45.2°$
$f = 100$                         Wavelength $\lambda = 780$ nm
$fv/f = 0.4135$                   F/NO 50
$Bf = 33.76$ FIGS. 8A-8C show distortions of a sixth embodiment according to this invention.

In each of the specific embodiments, the back focal length of the lens system in the scan plane is shorter than its focal length, and the optical path between the deflecting surface 4 and the image plane 7 is reduced. Thus, as is evident from the aberration curves, the aberrations are sufficient for practical use.

Several embodiments of the invention have now been described in detail. It is to be noted, however, that these descriptions of specific embodiments are merely illustrative of the principles underlying the inventive concept. It is contemplated that various modifications of the disclosed embodiments, as well as other embodiments of the invention will, without departing from the spirit and scope of the invention, be apparent to persons skilled in the art.

What is claimed is:

1. An optical scanning system with a tilt correction function including a first focusing optical system for focusing a light beam from a light source in the form of a line image upon or, adjacent to, the deflecting surface of a deflecting means, and a second focusing optical system for focusing, on an image plane, an image of said line image, wherein the improvement comprises;

the second focusing optical system including, respectively from the deflecting means, a first single lens and a second single lens, the first single lens, with a positive refracting power in a plane of scan, having a toric surface and the second single lens, with a negative refracting power in the scan plane, having an aspherical surface with a radius of curvature in the scan plane which changes with distance from the optical axis of the second focusing optical system.

2. An optical scanning system with a tilt correction function as defined in claim 1 wherein said first single lens has a cylindrical or toric surface on side faced to the deflecting means, and has said toric surface on the side faced to said image plane.

3. An optical scanning system with a tilt correction function as defined in claim 1 wherein said first single lens has a convex curvature on the side faced to said image plane.

4. An optical scanning system with a tilt correction function as defined in claim 1 wherein said first single lens is constituted of a meniscus lens which has a positive power in the plane perpendicular to the scan surface in the plane formed along the sub-scan direction.

5. An optical scanning system with a tilt correction function as defined in claim 4 wherein said meniscus lens has, respectively from the deflecting means in the plane perpendicular to the scan surface, a concave curvature relative to the deflecting means and a convex curvature relative to the image plane.

6. An optical scanning system with a tilt correction function as defined in claim 1 wherein said second single lens has an aspherical surface on either side thereof.

7. An optical scanning system with a tilt correction function as defined in claim 6 wherein said second single lens has, respectively from the deflecting means in the scan plane, a concave curvature relative to the deflecting means and a convex curvature relative to the image plane.

8. An optical scanning system with a tilt correction function as defined in claim 6 wherein said second single lens has, respectively from the deflecting means in the plane perpendicular to the scan surface, either a concave curvature or a linear plane surface relative to the deflecting means and a convex or a linear surface relative to the image plane.

9. An optical scanning system with a tilt correction function as defined in claim 6 wherein said second single lens is made of a material which is easily processed into an aspherical shape.

10. An optical scanning system with a tilt correction function as defined in claim 1 wherein said first single lens has, respectively from the deflector, a cylindrical surface and a toric surface, and the second single lens has, respectively from the deflector, an aspherical surface and a spherical surface, and the specific values are shown in the table below:

| m | r | rv | d | n |
|---|---|----|---|---|
| 1 | ∞ | −48.152 | 13.91 | 1.71222 |
| 2 | −60.110 | −14.896 | 12.22 | |
| 3 | aspherical surface | aspherical surface | 3.76 | 1.48471 |
| 4 | −62.161 | −62.161 | | | wherein an aspherical shape is determined by the following equation $$Z = cc \cdot y^2/(1 + \sqrt{1 - k \cdot cc^2 \cdot y^2}) + \sum_{i=2}^{5} (ai \cdot y^{2i})$$

where, "y" designates a distance from the optical axis X of the aspherical surface; and Z, a coordinate in the direction of optical axis X when the position of the plane on the optical axis X is set to zero and the coefficients of the aspherical surface are as follows:

| cc = −2.0384 × 10⁻² | k = 1.0329 |
|---|---|
| a2 = 3.2846 × 10⁻⁷ | a3 = −2.9239 × 10⁻¹⁰ |
| a4 = 7.6774 × 10⁻¹⁴ | a5 = 1.5020 × 10⁻¹⁷ | wherein
- m: a surface number which is counted respectively from the object
- r: a radius of curvature in a scan plane
- rv: a radius of curvature in the plane orthogonal to the scan direction (in a direction of sub-scan)
- d: the thickness of lens or an aerial spacing
- n: a refractive index at a wavelength of 780 nm
- d0: a distance between a deflecting surface and a first surface of a second focusing optical system
- f: a synthetic focal length of the second focusing optical system in the scan plane
- fv: a synthetic focal length of the second focusing optical system in the plane orthogonal to the scan direction (in the sub-scan direction)
- Bf: a synthetic back focus of the second focusing optical system in the scan plane whereby followings are obtained:

| d0 = 27.76 | Scan angle θ = 45.2° |
|---|---|
| f = 100 | Wavelength λ = 780 nm |
| fv/f = 0.2719 | F/NO 50 |
| Bf = 84.65. | |

11. An optical scanning system with a tilt correction function as defined in claim 1 wherein said first single lens has, respectively from the deflector, a cylindrical surface and a toric surface, and the second single lens has, respectively from the deflector, a spherical surface and an aspherical surface, and the specific values are shown in the table below:

| m | r | rv | d | n |
|---|---|----|---|---|
| 1 | ∞ | −48.152 | 13.91 | 1.71222 |
| 2 | −60.110 | −14.896 | 12.22 | |
| 3 | −49.058 | −49.058 | 3.76 | 1.48471 |
| 4 | aspherical surface | aspherical surface | | | wherein an aspherical shape is determined by the following equation $$Z = cc \cdot y^2/(1 + \sqrt{1 - k \cdot cc^2 \cdot y^2}) + \sum_{i=2}^{5} (ai \cdot y^{2i})$$

where "y" designates a distance from the optical axis X of the aspherical surface; and Z, a coordinate in the direction of optical axis X when the position of the plane on the optical axis X is set to zero and the coefficients of the aspherical surface are as follows:

| cc = −1.6087 × 10⁻² | k = 3.2059 × 10⁻¹ |
|---|---|
| a2 = −6.7609 × 10⁻⁷ | a3 = 3.7061 × 10⁻¹⁰ |
| a4 = −2.2867 × 10⁻¹³ | a5 = 3.8416 × 10⁻¹⁷ | wherein
- m: a surface number which is counted respectively from the object
- r: a radius of curvature in a scan plane
- rv: a radius of curvature in the plane orthogonal to the scan direction (in a direction of sub-scan)

d: the thickness of lens or an aerial spacing
n: a refractive index at a wavelength of 780 nm
d0: a distance between a deflecting surface and a first surface of a second focusing optical system
f: a synthetic focal length of the second focusing optical system in the scan plane
fv: a synthetic focal length of the second focusing optical system in the plane orthogonal to the scan direction (in the sub-scan direction)
Bf: a synthetic back focus of the second focusing optical system in the scan plane whereby followings are obtained:

| d0 = 27.76 | Scan angle $\theta$ = 45.2° |
|---|---|
| f = 100 | Wavelength $\lambda$ = 780 nm |
| fv/f = 0.2719 | F/NO 50 |
| Bf = 84.65. | |

12. An optical scanning system with a tilt correction function as defined in claim 1 wherein said first single lens has, respectively from the deflector, a cylindrical surface and a toric surface, and the second single lens has two aspherical surfaces, and the specific values are as follows:

| m | r | rv | d | n |
|---|---|---|---|---|
| 1 | ∞ | −48.152 | 13.91 | 1.71222 |
| 2 | −60.110 | −14.896 | 12.22 | |
| 3 | aspherical surface 1 | aspherical surface 1 | 3.76 | 1.48471 |
| 4 | aspherical surface 2 | aspherical surface 2, | | | wherein an aspherical shape is determined by the following equation $$Z = cc \cdot y^2/(1 + \sqrt{1 - k \cdot cc^2 \cdot y^2}) + \sum_{i=2}^{5}(ai \cdot y^{2i})$$

where, "y" designates a distance from the optical axis X of the aspherical surface; and Z, a coordinate in the direction of optical axis X when the position of the plane on the optical axis X is set to zero and the coefficients of the aspherical surface 1 are as follows:

| cc = −2.0384 × $10^{-2}$ | k = −2.3614 |
|---|---|
| a2 = −3.4655 × $10^{-6}$ | a3 = −3.9192 × $10^{-9}$ |
| a4 = 2.6091 × $10^{-12}$ | a5 = 8.6327 × $10^{-17}$, | and the coefficients of the aspherical surface 2 are as follows:

| cc = −1.6087 × $10^{-2}$ | k = 1.4803 |
|---|---|
| a2 = 9.0000 × $10^{-5}$ | a3 = −2.9357 × $10^{-9}$ |
| a4 = 1.9851 × $10^{-12}$ | a5 = −9.3835 × $10^{-17}$ | wherein
m: a surface number which is counted respectively from the object
r: a radius of curvature in a scan plane
rv: a radius of curvature in the plane orthogonal to the scan direction (in a direction of sub-scan)
d: the thickness of lens or an aerial spacing
n: a refractive index at a wavelength of 780 nm
d0: a distance between a deflecting surface and a first surface of a second focusing optical system
f: a synthetic focal length of the second focusing optical system in the scan plane
fv: a synthetic focal length of the second focusing optical system in the plane orthogonal to the scan direction (in the sub-scan direction)
Bf: a synthetic back focus of the second focusing optical system in the scan plane whereby followings are obtained:

| d0 = 27.76 | Scan angle $\theta$ = 45.2° |
|---|---|
| f = 100 | Wavelength $\lambda$ = 780 nm |
| fv/f = 0.2719 | F/NO 50 |
| Bf = 85.05. | |

13. An optical scanning system with a tilt correction function as defined in claim 1 wherein said first single lens has two toric surfaces, and the second single lens has, respectively from the deflector, a spherical surface and an aspherical surface, and the specific values are shown in the table below:

| m | r | rv | d | n |
|---|---|---|---|---|
| 1 | −527.692 | −47.571 | 13.91 | 1.71222 |
| 2 | −51.237 | −14.648 | 12.22 | |
| 3 | −38.789 | −38.789 | 3.76 | 1.48471 |
| 4 | aspherical surface | aspherical surface | | | wherein an aspherical shape is determined by the following equation $$Z = cc \cdot y^2/(1 + \sqrt{1 - k \cdot cc^2 \cdot y^2}) + \sum_{i=2}^{5}(ai \cdot y^{2i})$$

where, "y" designates a distance from the optical axis X of the aspherical surface; and Z, a coordinate in the direction of optical axis X when the position of the plane on the optical axis X is set to zero and the coefficients of the aspherical surface are as follows:

| cc = −1.9379 × $10^{-2}$ | k = 5.2097 × $10^{-1}$ |
|---|---|
| a2 = −8.2525 × $10^{-7}$ | a3 = −5.4780 × $10^{-10}$ |
| a4 = 4.8193 × $10^{-13}$ | a5 = −3.0601 × $10^{-16}$ | wherein
m: a surface number which is counted respectively from the object
r: a radius of curvature in a scan plane
rv: a radius of curvature in the plane orthogonal to the scan direction (in a direction of sub-scan)
d: the thickness of lens or an aerial spacing
n: a refractive index at a wavelength of 780 nm
d0: a distance between a deflecting surface and a first surface of a second focusing optical system
f: a synthetic focal length of the second focusing optical system in the scan plane
fv: a synthetic focal length of the second focusing optical system in the plane orthogonal to the scan direction (in the sub-scan direction)
Bf: a synthetic back focus of the second focusing optical system in the scan plane whereby followings are obtained:

| d0 = 27.76   | Scan angle $\theta$ = 45.2° |
|---|---|
| f = 100      | Wavelength $\lambda$ = 780 nm |
| fv/f = 0.2715 | F/NO 50 |
| Bf = 85.05.  | |

14. An optical scanning system with a tilt correction function as defined in claim 1 wherein said first single lens has, respectively from the deflector, a cylindrical surface and a toric surface, and the second single lens has, respectively from the deflector, an aspherical surface and a cylindrical surface, and the specific values are as follows:

| m | r | rv | d | n |
|---|---|---|---|---|
| 1 | ∞ | −44.868 | 13.53 | 1.71222 |
| 2 | −46.691 | −10.423 | 5.41 | |
| 3 | aspherical surface | aspherical surface | 12.03 | 1.76592 |
| 4 | −57.118 | ∞ | | | wherein an aspherical shape is determined by the following equation $$Z = cc \cdot y^2/(1 + \sqrt{1 - k \cdot cc^2 \cdot y^2}) + \sum_{i=2}^{5}(ai \cdot y^{2i})$$

where, "y" designates a distance from the optical axis X of the aspherical surface; and Z, a coordinate in the direction of optical axis X when the position of the plane on the optical axis X is set to zero and the coefficients of the aspherical surface are as follows:

| cc = −2.5318 × 10$^{-2}$ | k = 1.0494 |
|---|---|
| a2 = 3.8558 × 10$^{-7}$ | a3 = −6.6883 × 10$^{-10}$ |
| a4 = 6.2253 × 10$^{-13}$ | a5 = −4.0857 × 10$^{-17}$ | wherein
- m: a surface number which is counted respectively from the object
- r: a radius of curvature in a scan plane
- rv: a radius of curvature in the plane orthogonal to the scan direction (in a direction of sub-scan)
- d: the thickness of lens or an aerial spacing
- n: a refractive index at a wavelength of 780 nm
- d0: a distance between a deflecting surface and a first surface of a second focusing optical system
- f: a synthetic focal length of the second focusing optical system in the scan plane
- fv: a synthetic focal length of the second focusing optical system in the plane orthogonal to the scan direction (in the sub-scan direction)
- Bf: a synthetic back focus of the second focusing optical system in the scan plane whereby followings are obtained:

| d0 = 23.30   | Scan angle $\theta$ = 45.2° |
|---|---|
| f = 100      | Wavelength $\lambda$ = 780 nm |
| fv/f = 0.2192 | F/NO 50 |
| Bf = 93.50.  | |

15. An optical scanning system with a tilt correction function as defined in claim 1 wherein said first single lens has, respectively from the deflector, a cylindrical surface and a toric surface, and the second single lens has, respectively from the deflector, a cylindrical surface and an aspherical surface, and the specific values are as follows:

| m | r | rv | d | n |
|---|---|---|---|---|
| 1 | ∞ | −21.488 | 15.40 | 1.71222 |
| 2 | −60.791 | −14.065 | 52.28 | |
| 3 | −50.567 | ∞ | 15.04 | 1.76592 |
| 4 | aspherical surface | aspherical surface | | | wherein an aspherical shape is determined by the following equation $$Z = cc \cdot y^2/(1 + \sqrt{1 - k \cdot cc^2 \cdot y^2}) + \sum_{i=2}^{5}(ai \cdot y^{2i})$$

where, "y" designates a distance from the optical axis X of the aspherical surface; and Z, a coordinate in the direction of optical axis X when the position of the plane on the optical axis X is set to zero and the coefficients of the aspherical surface are as follows:

| cc = −1.6061 × 10$^{-2}$ | k = 9.9497 × 10$^{-1}$ |
|---|---|
| a2 = −2.6724 × 10$^{-8}$ | a3 = −4.4664 × 10$^{-11}$ |
| a4 = 3.1036 × 10$^{-14}$ | a5 = −5.3904 × 10$^{-18}$ | wherein
- m: a surface number which is counted respectively from the object
- r: a radius of curvature in a scan plane
- rv: a radius of curvature in the plane orthogonal to the scan direction (in a direction of sub-scan)
- d: the thickness of lens or an aerial spacing
- n: a refractive index at a wavelength of 780 nm
- d0: a distance between a deflecting surface and a first surface of a second focusing optical system
- f: a synthetic focal length of the second focusing optical system in the scan plane
- fv: a synthetic focal length of the second focusing optical system in the plane orthogonal to the scan direction (in the sub-scan direction)
- Bf: a synthetic back focus of the second focusing optical system in the scan plane whereby followings are obtained:

| d0 = 28.66   | Scan angle $\theta$ = 45.2° |
|---|---|
| f = 100      | Wavelength $\lambda$ = 780 nm |
| fv/f = 0.4135 | F/NO 50 |
| Bf = 33.76.  | |

16. An optical scanning system with a tilt correction function as defined in claim 1 wherein following conditions should be satisfied in selecting a material for use as said second focusing optical system $$0.2 < fv/f < 0.5$$

where, "fv" designates a synthetic focal length of the second focusing optical system, which lies in the plane orthogonal to the main scan direction, and "f", a synthetic focal length of the second focusing optical system, which lies in the scan plane.

* * * * *

UNITED STATES PATENT AND TRADEMARK OFFICE
CERTIFICATE OF CORRECTION

PATENT NO. : 5,343,325
DATED : August 30, 1994
INVENTOR(S) : Hiromitsu Yamakawa

It is certified that error appears in the above-indentified patent and that said Letters Patent is hereby corrected as shown below:

On title page, item [75], "Ohmiya" should read --Saitama--; Item [56], "Yawmakawa" should read --Yamakawa--.

Column 1, line 21: The words "scan or an" should read --scan an--.

Column 6, following line 21 (beginning "a4 = ..."): Insert the following line:
  --d0 = 27.76     Scan angle $\theta$ = 45.2°--

Column 7, line 12: The amount "-2.6091" should read --2.6091--.

Column 14, line 47: The phrase "whereby followings are obtained:" should appear at the left margin on the following line.

Signed and Sealed this

Thirty-first Day of January, 1995

Attest:

BRUCE LEHMAN

Attesting Officer

Commissioner of Patents and Trademarks